H. C. STOUFFER.
HAY-ELEVATOR.
No. 190,384. Patented May 1, 1877.
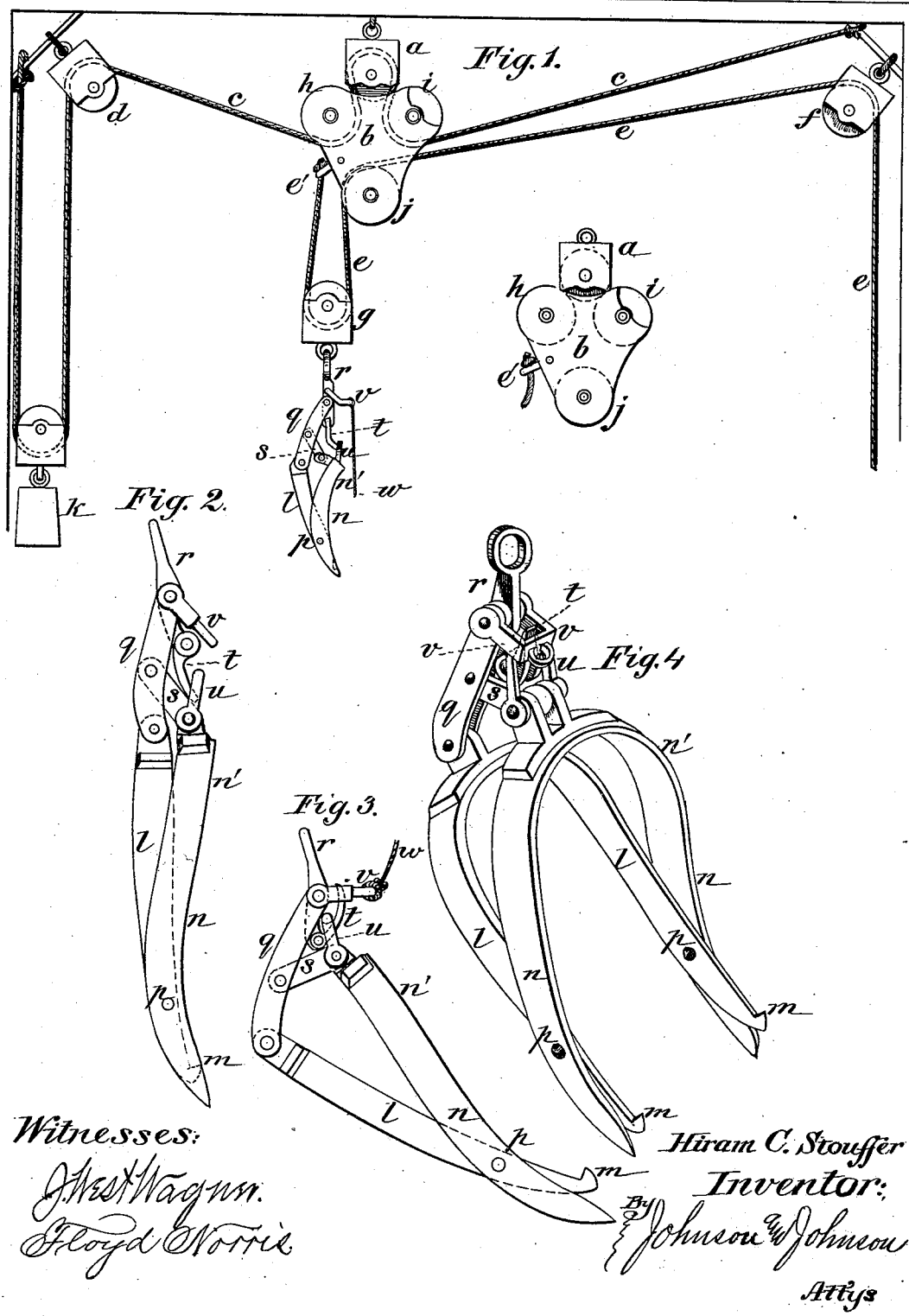
Witnesses:
J. West Wagner.
Floyd Norris.
Hiram C. Stouffer
Inventor:
By Johnson & Johnson
Att'ys

UNITED STATES PATENT OFFICE.

HIRAM C. STOUFFER, OF CANFIELD, ASSIGNOR OF A PART OF HIS RIGHT TO LEMUEL T. FOSTER AND UPSON A. ANDREWS, OF YOUNGSTOWN, OHIO.

IMPROVEMENT IN HAY-ELEVATORS.

Specification forming part of Letters Patent No. 190,384, dated May 1, 1877; application filed April 5, 1877.

*To all whom it may concern:*

Be it known that I, HIRAM C. STOUFFER, of Canfield, in the county of Mahoning and State of Ohio, have invented certain new and useful Improvements in Hay Elevators and Carriers, which improvements are fully set forth in the following specification and accompanying drawings.

The apparatus is for use in the barn or elsewhere, to raise the hay from the loaded wagon and carry it to the mow or elsewhere.

For this purpose I have devised a new fork and improved and simplified the carrying device.

The fork proper has two tines, the ends being formed into hooks or barbs adapted to enter the hay freely and to load itself on being drawn out. A link or arm centrally pivoted to the bow or heel portion of the tines serves to suspend the fork to the carrying device.

A supplemental fork, with plain tines, is pivoted to the fork proper near its hooked ends, so as to open and close with the tines, similar to a pair of shears, the object being to disengage the hay from the fork by closing the tines and pushing the hay off the hooks, to allow it to slide off the tines when it is raised over the mow. The upper bowed portion of the supplemental fork has a link connection with the pivoted arm of the hooked fork, by which the opening and closing of the supplemental tines is effected when the ends of the forks are raised or lowered. In entering the fork in the hay, the supplemental tines are closed, and immediately after they are opened to allow the hooks or barbs to take into the hay and load the fork. In this position the lower ends of the tines are raised, to bring the fork to about an angle of twenty degrees, more or less, from a horizontal position, and in which it is maintained by a tripping-catch device interlocking with a link of the supplemental tines, and pivoted to the upper end of the fork-arm, and which catch device serves as the immediate connection with the carrying device.

In raising and carrying the hay, the upper portion of the supplemental tined device forms the back of the fork, so that the hay is held upon the hooked tines and against the back of the supplemental tines, the ends of which stand below the hooks in positions to close and push off the hay when the fork is tripped, the supplemental tines taking the place of the hooked tines, and covering the hooks in discharging the hay from the tines as from an inclined plane.

The carrying device consists of a carrier having three pulleys arranged in triangular positions, to afford a more simple arrangement for the operating-ropes, which pass over sheaves fixed to the rafters of the barn.

Referring to the drawings, Figure 1 represents the apparatus as it is arranged for use in a barn, the fork-tines being closed, so as to cover the hooks in entering the hay; Fig. 2, a similar view of the fork enlarged; Fig. 3, a similar view of the fork, showing the tines open and their hooked ends in position to hold and carry the hay thereon; and Fig. 4, the fork device in perspective, and as shown in Fig. 3.

The fork is designed to act upon the principle of the hand-tined fork, especially in freeing the hay from the tines, by allowing it to slide from them as from the plain straight tines, thereby saving much trouble and annoyance in the operation.

Three sheave-blocks are secured to the rafters of the barn or other place, at such distances apart as may be required for the work, the middle one, $a$, being arranged to act directly with the fork-carrier $b$, and over which middle sheave the carrying-rope $c$ passes to the block $d$, while the horse or draft rope $e$ passes over the third sheave-block $f$, and, connecting with the fork-carrier $b$ at $c'$, carries said fork by a sheave-block, $g$, from which the fork is suspended.

The fork-carrier $b$ has three sheaves, $h\ i\ j$, fitted between triangular-shaped plates at the angles thereof. Over two of these, $h\ i$, the carrying-rope $c$ passes, and is fastened at its ends, near the sheave-blocks $d\ f$, with a weight, $k$, below the sheave-block $d$, acting to constantly draw and hold the carrier *b* to the sheave-block *a* as the point from which the fork is elevated and lowered.

The carrying-rope *c* passes under the top sheave *h* of the carrier *b*, over the sheave *a*, and around the carrier-sheave *i*; thence to the sheave *d* and the weight-carrying sheave, so that the carrier is drawn back and forth upon a rope by a simple arrangement of carrier-sheaves, while the separate draft-rope *e* draws the carrier at the point at which the hay is to be delivered. The weight is sufficient to hold the carrier *b* directly against the sheave *a* until the loaded fork is raised in position to be carried to the mow. This gives a very simple carrying and draft arrangement, requiring no catches or fastening devices.

The fork *l* has two tines, like an ordinary pitchfork, except that they have short hooks or barbs *m*, rising from their ends. A supplemental fork, *n*, is pivoted to the hooked tines by pivots *p* near their ends, so that the tines will lie by each other, and open and close like the blades of a pair of shears, closing to cover and shield the fork-hooks *m*, as shown in Fig. 2, to allow them to be thrust into the hay to load, and to discharge it from the fork after being carried to the mow, and opening, to effect the loading of the fork, by unshielding the hooks *m*, and holding the load until carried over the mow, as shown in Figs. 3 and 4.

The supplemental fork *n* is curved over in front of, and forms the back *n'* of, the fork *l* proper, upon which and by the hooks *m* the hay is held on the fork.

The supplemental fork may be arranged with its tines inside or outside of the main fork, and these tines must be wide enough to cover the sides of the hooks *m* when the tines are closed.

The fork proper is carried by a link or arm, *q*, pivoted to the heel or inner end thereof, the upper end of said link being pivoted to a coupling, *r*, which directly connects with the sheave of the draft-rope. A short coupling, *s*, pivoted to the link or arm *q*, connects with the heel or inner end of the supplemental fork *n* by a pivot-joint, giving a flexing capacity to these parts.

The lower end of the coupling *r* carries a catch, *t*, pivoted and adapted to maintain its free end in position to interlock with a fixed staple or eye, *u*, extending from the heel end of the supplemental fork, and to be turned up and locked with a detent, *v*, pivoted to the upper end of the link or arm *q*, when the supplemental fork is open and the tine-hooks out to hold the hay, as shown in Figs. 3 and 4.

The fixed staple or eye *u* stands up, and the pivoted detent *v* stands in front, and when the tines are closed to cover or shield the hooks, the catch *t* hangs down into the fixed eye *u*, and just over the upper edge of the short coupling *s*, which stands upward and backward, (see Fig. 2,) so that upon pressing the upper end of the link *q* forward the said link will open the heel ends of the fork and cause the ends of the supplemental tines to be moved back and uncover the tine-hooks, the catch *t* having meanwhile been extended fully into eye *u*, and turned up by the contact therewith of the short coupling *s*, so as to bring the end of said catch in position to receive the detent *v*, which is put over it by the man on the hay-load. In this action the link *s* serves as a bearing, to turn the catch up automatically in position to receive the locking-detent.

The construction brings and holds the parts in position to be fastened in loading the fork, and saves the trouble of having to adjust the catch first with the eye of the supplemental fork.

In the adjustment of the fork for elevating the hay, its tines hang in an inclined position, with the hooks out and up, and the hay, being held thereon and against the upwardly-curved back *n'* of the supplemental fork, is elevated and carried as upon a backed chair-seat. When the fork is drawn over the mow, the man thereon has only to take hold of and pull the cord *w*, so as to raise the detent *v*, when the weight of the hay upon the hooked tines and the action of the short coupling *s* closes the rear end of the fork and brings the tine-ends coincident, so as to cover or withdraw the hooks within or between the edges of the supplemental tines, and allows the hay to slide off as if the tines had no hooks.

The fork is then drawn back over and down to the wagon by the weight and the cord *w*, the man on the hay-load always keeping hold of said cord.

I claim—

1. In a hay elevator and carrier, a fork having hooked tines, in combination with a supplemental fork pivoted to the hooked tines, and adapted to uncover and cover the hooks of said tines in elevating and discharging the hay therefrom.

2. A hay elevating and carrying fork, *l*, having hooks *m* rising from its tines, and a supplemental fork, *n*, constructed and adapted to form a back, *n'*, for said hooked fork to hold and carry the hay and present smooth tines, to disengage and discharge the hay from and over the hooked tines.

3. The combination, with a fork having hooked tines and supplemental pivoted fork opening and closing therewith, of a locking and tripping device adapted to hold the hooked and supplemental tines to carry the hay, and to automatically withdraw said hooks from holding positions when said locking device is tripped.

4. The combination, with the hooked and supplemental forks, pivoted to operate as described, of the pivoted arm or link *q* and its coupling *s*, uniting the heel-ends of the fork, the draft-rope coupling r, its pivoted catch t, the fixed eye u, and the pivoted detent v, adapted for co-operation to hold the hooked ends of the fork up for action, and the supplemental fork in proper relation thereto.

5. The locking and tripping device of a hay elevator and carrier, having the pivoted catch t, the couplings r and s, the pivoted detent v, and the fixed eye u, arranged in relation to each other and the pivoted fork-tines, to bring said catch automatically in position to receive the detent in adjusting the hooked tines to catch into the hay.

In testimony whereof I have affixed my signature in the presence of two witnesses.

HIRAM C. STOUFFER.

Witnesses:
A. E. H. JOHNSON,
J. W. HAMILTON JOHNSON.